M. SKAKSON.
REVOLVING HARROW.
APPLICATION FILED JULY 23, 1913.
1,125,409.
Patented Jan. 19, 1915.
2 SHEETS—SHEET 1.
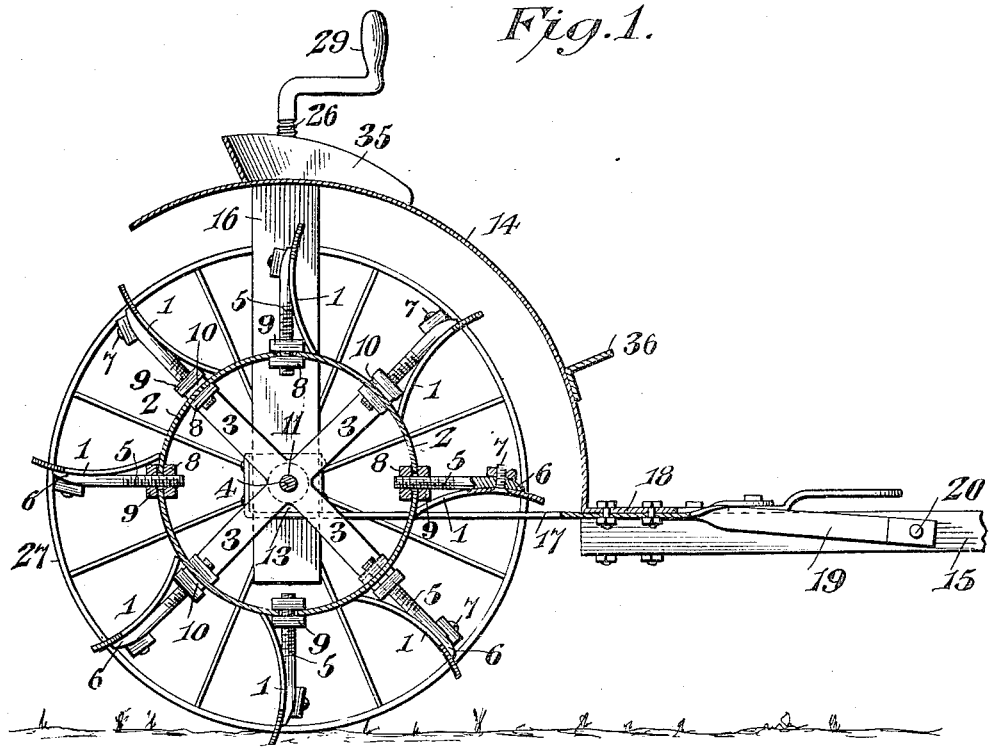
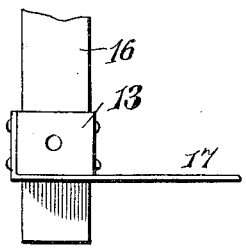
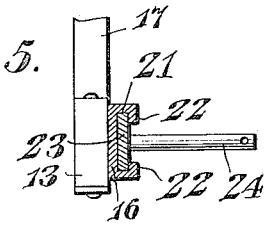
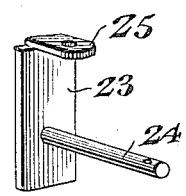
WITNESSES
Martinas Skakson, INVENTOR
ATTORNEY

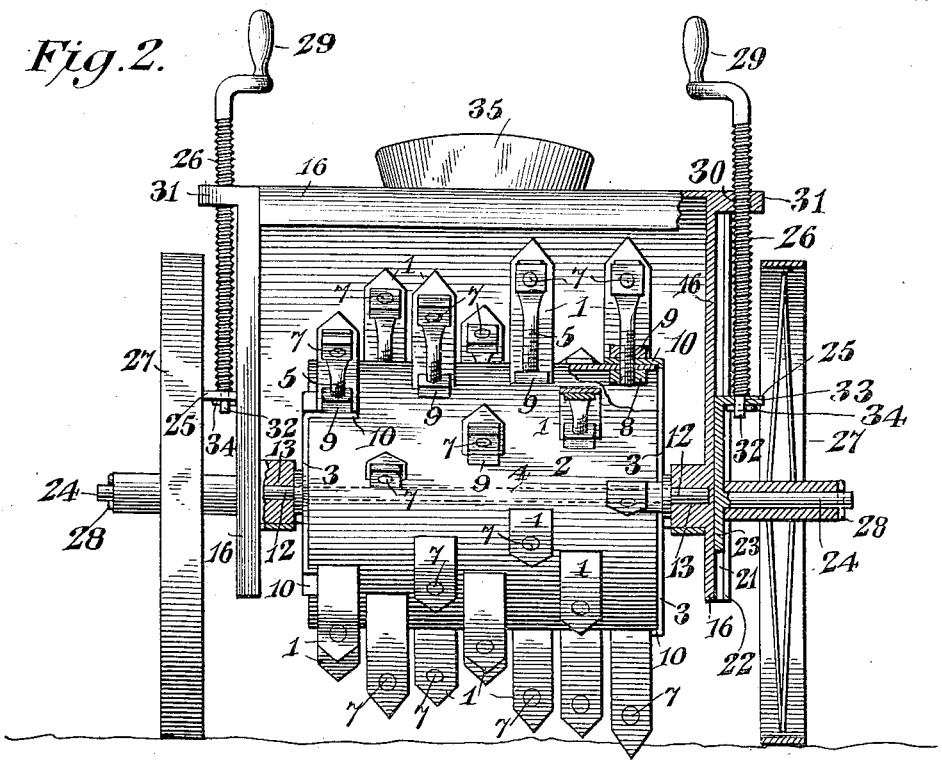

UNITED STATES PATENT OFFICE.

MARTINAS SKAKSON, OF MISSOURI VALLEY, IOWA.

REVOLVING HARROW.

1,125,409.　　　　Specification of Letters Patent.　　Patented Jan. 19, 1915.

Application filed July 23, 1913. Serial No. 780,827.

*To all whom it may concern:*

Be it known that I, MARTINAS SKAKSON, a citizen of the United States, residing at Missouri Valley, in the county of Harrison and State of Iowa, have invented a new and useful Revolving Harrow, of which the following is a specification.

The invention relates to improvements in revolving harrows.

The object of the present invention is to improve the construction of revolving harrows, and to provide a simple and comparatively inexpensive harrow of strong and durable construction, adapted to dig up the ground and leave the same level and smooth and in proper condition for cultivation.

A further object of the invention is to provide a revolving harrow equipped with adjustable means adapted to enable the harrow teeth to be raised and lowered to elevate them clear of the ground and also to enable them to penetrate the soil to the desired depth.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a longitudinal sectional view of a revolving harrow, constructed in accordance with this invention. Fig. 2 is a transverse sectional view of the same. Fig. 3 is a detail perspective view of a portion of the main frame, illustrating the construction of the curved guard or shield. Fig. 4 is a detail view of one of the bearings of the main frame. Fig. 5 is a detail horizontal sectional view, illustrating the manner of mounting the slides. Fig. 6 is a detail perspective view of one of the slides.

Like numerals of reference designate corresponding parts in all the figures of the drawings.

In the accompanying drawings in which is illustrated the preferred embodiment of the invention, 1 designates harrow teeth mounted on the exterior of a transversely disposed cylindrical shell 2 constituting a revolving support for the teeth and constructed of suitable metal and provided at its ends with spiders 3, which are mounted on a transverse shaft 4. The harrow teeth, which are curved longitudinally, have their inner ends fitted against the outer face of the cylindrical shell and extend outwardly therefrom, their outer ends being tapered as shown. The teeth, which present front concave faces to the soil in approaching the same, are adapted to readily enter the soil and are secured to the cylindrical shell by means of threaded stems 5, having flattened outer terminal portions 6 to which the harrow teeth are directly secured by bolts 7, which pierce the outer portions of the said teeth. The threaded stems 5 pierce the cylindrical shell 2 and are provided with inner and outer nuts 8 and 9 between which the shell is firmly clamped, whereby the harrow teeth are rigidly mounted on the shell and supported in a projecting position. The harrow teeth are preferably disposed in diagonal rows on the cylindrical shell and the teeth of each row are arranged opposite the spaces or intervals between the teeth of the adjacent rows. By this arrangement the soil over which the harrow passes is thoroughly and uniformly operated on by the harrow teeth.

No claim is made in the present application to the construction of the harrow cylinder.

The arms of the spider 3 are provided with inwardly extending terminal lugs 10, preferably arranged on the exterior of the cylindrical shell and pierced by the threaded stems of the adjacent harrow teeth and secured to the shell by the nuts of such threaded stems. The spiders are provided with central openings 11 in which the shaft 4 is secured. The said shaft projects beyond the spiders to form terminal journals 12, which are arranged in suitable bearings 13 of a main or supporting frame. The shaft, which is fixed to the cylindrical shell, rotates freely in the said bearings, but the cylindrical shell may be journaled in any other suitable manner.

The main or supporting frame comprises in its construction a curved guard or shield 14 of stout sheet metal or other suitable material and extending upwardly and rearwardly from the rear end of a tongue 15 over the front and top portion of the revolving cylinder or cylindrical shell, as clearly illustrated in Fig. 1 of the drawings. The curved guard or shield is connected at its side edges to the upper ends of a pair of vertical standards 16, which are connected at their lower portions with the front portion of the guard or shield by side bars 17. The guard or shield 14 is provided at the front with a forwardly extending horizontally disposed transverse flange 18, constituting a step and centrally secured to the upper face of the tongue at the rear end thereof. The ends of the flange 18 are also bolted or otherwise secured to the front ends of the side bars 17 and the tongue is braced by a pair of forwardly converging bars or braces 19 secured at their rear ends to the lower face of the flange 18 adjacent to the front end of the side bars 17 and having their front terminals secured to the side edges or faces of the tongue by a transverse fastening device 20. The bearings, which receive the terminals of the transverse shaft 4, are arranged at the rear ends of the side bars and at the inner faces of the vertical standards 16. The parts of the main or supporting frame may be fastened together by any suitable means, and the frame may be braced in any preferred manner to provide a structure of the requisite strength.

The vertical standards 6 are provided at their outer faces with ways 21, formed by vertical guide flanges 22 arranged at the side edges of the standards and approximately L-shaped in cross section to provide opposite grooves. The ways receive slides 23 consisting of plates or pieces having their side edges fitted in the grooves of the flanges 22 and provided at their lower portions with outwardly projecting journals 24 and having lugs or ears 25, extending outwardly from the upper ends of the slides and connected with vertical adjusting screws 26. The journals of the slides receive wheels 27 secured on the journals by keys 28 or other suitable fastening means and supporting the machine. The vertical adjusting screws, which are provided at their upper ends with crank handles 29 or other suitable operating means, engage threaded openings 30 of fixed nuts or lugs 31 and are provided with smooth reduced lower terminals 32 secured in openings 33 of the lugs or ears 25 by keys 34 or other suitable fastening means. The fixed nuts or lugs 31 are arranged at the upper ends of the standards 16 and are preferably formed integral therewith. The screws are adapted to be adjusted to raise and lower the main or supporting frame and the revolving cylinder to arrange the harrow teeth clear of the ground and also in position to penetrate the soil to the desired depth. As the machine is drawn forward, the harrow teeth engage and penetrate the soil and uniformly dig up the same, leaving the soil in a smooth level condition without forming ridges and furrows therein.

The shield or guard is provided at the top portion with a curved seat flange 35 and it has a foot rest 36 at its lower portion. The guard or shield with the flange 35 forms a seat for the accommodation of the driver, and the foot rest 36 preferably consists of a substantially L-shaped bracket or plate having one of its sides or wings secured to the guard or shield.

What is claimed is:—

A harrow of the class described comprising a revolving support having a shaft provided with soil engaging means, a main frame including spaced vertical standards located at opposite sides of the harrow, said standards being provided at their outer faces with guides or ways and having bearings projecting from the inner faces of the standards at the lower portions thereof and receiving the transverse shaft, a curved guard or shield extending across the space between and connecting the upper ends of the standard, said guard or shield extending downwardly and forwardly over the revolving support, and side bars secured to and extending rearwardly from the lower front end of the guard or shield and connected at their rear ends with the lower portions of the standards, spindles adapted to receive the carrying wheels and having slides movable in the said guides or ways, adjusting means carried by the main frame and connected with the slides, and a tongue connected with the lower front portions of the guard or shield, the latter being provided at its upper portion with a seat.

In testimony, that I claim the foregoing as my own, I have hereto affixed my signature in the presence of two witnesses.

MARTINAS SKAKSON.

Witnesses:
H. M. SILSBY,
P. J. MORROW.

Copies of this patent may be obtained for five cents each, by addressing the "Commissioner of Patents, Washington, D. C."